(12) United States Patent
Metcalf

(10) Patent No.: US 12,533,324 B2
(45) Date of Patent: Jan. 27, 2026

(54) COMPOSITIONS AND METHODS RELATED TO ORGANIC OXIDES

(71) Applicant: Natural Extraction Systems, LLC, Boulder, CO (US)

(72) Inventor: Douglas G. Metcalf, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 910 days.

(21) Appl. No.: 17/771,139

(22) PCT Filed: Oct. 30, 2020

(86) PCT No.: PCT/US2020/058258
§ 371 (c)(1),
(2) Date: Apr. 22, 2022

(87) PCT Pub. No.: WO2021/087291
PCT Pub. Date: May 6, 2021

(65) Prior Publication Data
US 2022/0387351 A1    Dec. 8, 2022

Related U.S. Application Data

(60) Provisional application No. 62/971,797, filed on Feb. 7, 2020, provisional application No. 62/950,816, filed on Dec. 19, 2019, provisional application No. 62/935,491, filed on Nov. 14, 2019, provisional application No. 62/928,958, filed on Oct. 31, 2019.

(51) Int. Cl.
*A61K 31/05* (2006.01)
*A61K 31/353* (2006.01)
*A61K 47/02* (2006.01)
*A61K 47/10* (2017.01)

(52) U.S. Cl.
CPC ............ *A61K 31/05* (2013.01); *A61K 31/353* (2013.01); *A61K 47/02* (2013.01); *A61K 47/10* (2013.01)

(58) Field of Classification Search
CPC ...... A61K 31/05; A61K 31/353; A61K 47/02; A61K 47/10; A61K 9/0014; A61P 43/00
See application file for complete search history.

(56) References Cited

FOREIGN PATENT DOCUMENTS

CA    2760460 C  *  4/2019  ........... A61K 31/352

* cited by examiner

*Primary Examiner* — Deborah D Carr
(74) *Attorney, Agent, or Firm* — Douglas G. Metcalf

(57) ABSTRACT

Various aspects of this patent document relate to the newly-discovered organic oxide class of pharmaceuticals.

50 Claims, No Drawings

COMPOSITIONS AND METHODS RELATED TO ORGANIC OXIDES

CROSS-REFERENCE TO RELATED APPLICATIONS

This patent is the U.S. National Phase under 35 U.S.C. § 371 of International Application No. PCT/US20/58258, which claims priority to U.S. Provisional Patent Application No. 62/928,958, filed Oct. 31, 2019; U.S. Provisional Patent Application No. 62/935,491, filed Nov. 14, 2019; U.S. Provisional Patent Application No. 62/950,816, filed Dec. 19, 2019; and U.S. Provisional Patent Application No. 62/971,797, filed Feb. 7, 2020, each of which is incorporated by reference in its entirety.

BACKGROUND

The "Rule of Five" states that druglike molecules generally have an octanol-water partition coefficient of no greater than 5. A generally-applicable strategy to break this feature of the Rule of Five is desirable.

SUMMARY

An octanol-water partition coefficient of greater than 5 limits solubility in bodily fluids, which limits bioavailability. Many classes of druglike molecules that have octanol-water partition coefficients of greater than 5 can be converted into organic oxides that have octanol-water partition coefficients of less than 5 using simple acid/base chemistry. Such organic oxides convert back into their parent druglike molecules upon administration to a subject. Various aspects of this patent document relate to the discovery that the organic oxide form of a bioactive agent can allow the dispersion of druglike molecules in bodily fluids to overcome the octanol-water partition coefficient limitation set forth in the Rule of Five.

DETAILED DESCRIPTION

Various aspects of this patent document relate to a composition, comprising a cation, an anion, and an organic oxide, wherein: the cation has a molecular weight of at least 6.9 and no greater than 301 grams per mole; the cation has a net charge of either +1, +2, or +3; the anion has the chemical formula $C_2H_5O^{-1}$, $C_3H_7O_2^{-1}$, $C_3H_7O_3^{-1}$, $C_4H_9O_4^{-1}$, $C_5H_{11}O_5^{-1}$, $C_6H_{11}O_6^{-1}$, $C_6H_{13}O_6^{-1}$, or $C_7H_{15}O_7^{-1}$; the anion is an unbranched, fully-saturated, linear or cyclic hydrocarbon chain that is substituted such that (i) an oxide group (—O) is pendant from exactly one carbon atom of the hydrocarbon chain, and (ii) a single hydroxyl group (—OH) is optionally pendant from every other carbon atom of the hydrocarbon chain; the organic oxide has a molecular weight of at least 240 and no greater than 500 grams per mole; the organic oxide has the chemical formula $C_vH_wO_yX_z^{-1}$; v is an integer of at least 16 and no greater than 25; w is an integer of at least 16 and no greater than 39; y is either 1, 2, or 3; z is either 0 or 1; X is selected from F, Cl, Br, and I; the organic oxide comprises a benzene ring and an oxide group; the benzene ring comprises exactly 6 carbon atoms; the oxide group is pendant from a carbon atom of the benzene ring; the organic oxide has a net charge of −1; and the organic oxide lacks a carboxyl group (—$CO_2$H and —$CO_2^-$).

"Comprising" and "comprise(s)" refer to open-ended sets such that a composition that comprises a cation can also comprise, for example, a second cation.

In some specific embodiments, the cation has a charge of +1.

In some embodiments, the cation is a metal cation. In some specific embodiments, the cation is a metal cation selected from lithium cation ("Li+"); sodium cation ("Na+"); potassium cation ("K+"); magnesium cation ("Mg++"); calcium cation ("Ca++"); zinc cation ("Zn++"); manganese cation ("Mn++"); iron (II) cation ("Fe++"); iron (III) cation ("Fe+++"); copper (I) cation ("Cu+"); and copper (II) cation ("Cu++").

In some embodiments, the cation is an amine. In some specific embodiments, the cation is an amine selected from ammonium ("$NH_4$+"); protonated ethanolamine; choline; protonated lysine; protonated arginine; and protonated sphingosine.

"Substituted such that (i) an oxide group (—$O^-$) is pendant from exactly one carbon atom of the hydrocarbon chain, and (ii) a single hydroxyl group (—OH) is optionally pendant from every other carbon atom of the hydrocarbon chain" refers to a hydrocarbon chain, in which (a) every carbon atom of the hydrocarbon chain is bound to either 0 or 1 oxygen atoms, (b) exactly one oxygen atom that is bound to a carbon atom of the hydrocarbon chain is the oxygen atom of an oxide group, and (c) every oxygen atom that is bound to a carbon atom of the hydrocarbon chain, other than the oxygen atom of the oxide group, is an oxygen atom of a hydroxyl group.

In some specific embodiments, the anion has the molecular formula $C_2H_5O^{-1}$, which can be produced, for example, by deprotonating ethanol under alkaline conditions.

In some specific embodiments, the anion has the molecular formula $C_3H_7O_2^{-1}$, which can be produced, for example, by deprotonating propane-1,2-diol or propane-1,3-diol under alkaline conditions.

In some specific embodiments, the anion has the molecular formula $C_3H_7O_3^{-1}$, which can be produced, for example, by deprotonating propane-1,2,3-triol under alkaline conditions.

In some specific embodiments, the anion has the molecular formula $C_4H_9O_4^{-1}$, which can be produced, for example, by deprotonating a butane-1,2,3,4-tetrol under alkaline conditions.

In some specific embodiments, the anion has the molecular formula $C_5H_{11}O_5^{-1}$, which can be produced, for example, by deprotonating a pentane-1,2,3,4,5-pentol under alkaline conditions.

In some specific embodiments, the anion has the molecular formula $C_6H_{11}O_6^{-1}$, which can be produced, for example, by deprotonating a cyclohexane-1,2,3,4,5,6-hexol under alkaline conditions.

In some specific embodiments, the anion has the molecular formula $C_6H_{13}O_6^{-1}$, which can be produced, for example, by deprotonating a hexane-1,2,3,4,5,6-hexol under alkaline conditions.

In some specific embodiments, the anion has the molecular formula $C_7H_{15}O_7^{-1}$, which can be produced, for example, by deprotonating a heptane-1,2,3,4,5,6,7-heptol under alkaline conditions.

"Carboxyl group" encompasses both carboxylic acid groups, which have the formula —$CO_2$H, and carboxylate groups, which have the formula —$CO_2^-$.

In some preferred embodiments, a composition comprises hydroxide and water.

Various aspects of this patent document relate to a composition, comprising a cation, an anion, an organic oxide, hydroxide, and water, wherein: the cation is selected from sodium cation and potassium cation; the anion has the chemical formula $C_2H_5O^{-1}$; the anion is an unbranched, fully-saturated, linear hydrocarbon chain that is substituted such that an oxide group is pendant from exactly one carbon atom of the hydrocarbon chain; the organic oxide has a molecular weight of at least 240 and no greater than 388 grams per mole; the organic oxide has the chemical formula $C_vH_wO_y$; v is an integer of at least 16 and no greater than 25; w is an integer of at least 16 and no greater than 39; y is either 2 or 3; the organic oxide comprises a benzene ring and an oxide group; the benzene ring comprises exactly 6 carbon atoms; the oxide group is pendant from a carbon atom of the benzene ring; the organic oxide has a net charge of −1; and the organic oxide lacks a carboxyl group.

Various aspects of this patent document relate to a composition, comprising a cation, an anion, an organic oxide, hydroxide, and water, wherein: the cation is selected from sodium cation and potassium cation; the anion has the chemical formula $C_3H_7O_3^{-1}$; the anion is an unbranched, fully-saturated, linear hydrocarbon chain that is substituted such that (i) an oxide group is pendant from exactly one carbon atom of the hydrocarbon chain, and (ii) a single hydroxyl group is pendant from every other carbon atom of the hydrocarbon chain; the organic oxide has a molecular weight of at least 240 and no greater than 388 grams per mole; the organic oxide has the chemical formula $C_vH_wO_y$; v is an integer of at least 16 and no greater than 25; w is an integer of at least 16 and no greater than 39; y is either 2 or 3; the organic oxide comprises a benzene ring and an oxide group; the benzene ring comprises exactly 6 carbon atoms; the oxide group is pendant from a carbon atom of the benzene ring; the organic oxide has a net charge of −1; and the organic oxide lacks a carboxyl group.

In some very specific embodiments, the cation is sodium cation.

In some very specific embodiments, the cation is potassium cation.

In some very specific embodiments, the composition comprises the cation at a greater concentration than the anion by mole.

In some very specific embodiments, the composition comprises the cation at a greater concentration than the organic oxide by mole.

In some embodiments, the organic oxide has a molecular weight of at least 240 and no greater than 372 grams per mole. In some specific embodiments, the organic oxide has a molecular weight of at least 254 and no greater than 317 grams per mole. In some very specific embodiments, the organic oxide has a molecular weight of at least 254 and no greater than 261 grams per mole. In some very specific embodiments, the organic oxide has a molecular weight of at least 282 and no greater than 289 grams per mole. In some very specific embodiments, the organic oxide has a molecular weight of at least 310 and no greater than 317 grams per mole.

In some specific embodiments, v is an integer of at least 17 and no greater than 21; w is an integer of at least 18 and no greater than 32; y is 2 or 3; and, if z is present in a chemical formula, then z is 0. In some very specific embodiments, v is 17; w is an integer of at least 18 and no greater than 24; y is 2; and, if z is present in a chemical formula, then z is 0. In some very specific embodiments, v is 19; w is an integer of at least 22 and no greater than 28; y is 2; and, if z is present in a chemical formula, then z is 0. In some very specific embodiments, v is 21; w is an integer of at least 26 and no greater than 32; y is 2; and, if z is present in a chemical formula, then z is 0.

In some embodiments, the organic oxide has the general formula I, II, or III.

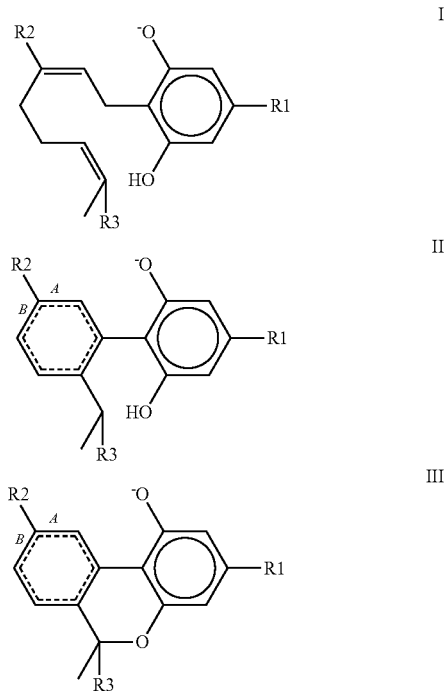

In some embodiments, R1 is selected from H; a straight or branched C1-C12 alkyl that is optionally substituted with either phenyl, a cycloalkyl, or a halogen; a straight or branched C2-C12 alkenyl that is optionally substituted with either phenyl, a cycloalkyl, or a halogen; and a straight or branched C2-C12 alkynyl that is optionally substituted with either phenyl, a cycloalkyl, or a halogen.

"Straight or branched C1-C12 alkyl" refers to an unbranched or branched hydrocarbon chain having 1, 2, 3, 4, 5, 6, 7, 8, 9, 10, 11, or 12 carbon atoms, wherein all carbon-carbon bonds in the hydrocarbon chain are single bonds.

"Substituted with either phenyl, a cycloalkyl, or a halogen" refers to the substitution of at least one hydrogen atom of a hydrocarbon chain with either phenyl, a cycloalkyl, or a halogen.

"Halogen" refers to F, Cl, Br, and I.

"Cycloalkyl" refers to cyclopropyl, cyclobutyl, cyclopentyl, cyclohexyl, cycloheptyl, and adamantyl. When a hydrocarbon chain is substituted with a cycloalkyl, then either (i) a single hydrogen atom of the hydrocarbon chain is substituted with the cycloalkyl such that the cycloalkyl does not include any carbon atom of the hydrocarbon chain, or (ii) two hydrogen atoms of the hydrocarbon chain are substituted with the cycloalkyl such that the cycloalkyl comprises one or more carbon atoms of the hydrocarbon chain.

"Straight or branched C2-C12 alkenyl" refers to an unbranched or branched hydrocarbon chain having 2, 3, 4, 5, 6, 7, 8, 9, 10, 11, or 12 carbon atoms, wherein at least one carbon-carbon bond in the hydrocarbon chain is a double bond and no carbon-carbon bond in the hydrocarbon chain is a triple bond.

"Straight or branched C2-C12 alkynyl" refers to an unbranched or branched hydrocarbon chain having 2, 3, 4, 5, 6, 7, 8, 9, 10, 11, or 12 carbon atoms, wherein at least one carbon-carbon bond in the hydrocarbon chain is a triple bond.

In some embodiments, R2 is selected from oxo; methylidene; methyl; hydroxymethyl; formyl; methoxycarbonyl; ethoxycarbonyl; 2-propoxycarbonyl; fluoromethyl; chloromethyl; bromomethyl; and iodomethyl;

In some embodiments, R3 is selected from a straight C1-C3 alkyl that is optionally substituted with either hydroxy or a halogen; a straight C1-C3 alkenyl that is optionally substituted with either hydroxy or a halogen; and a C2-C3 alkynyl that is optionally substituted with either hydroxy or a halogen.

"Straight C1-C3 alkyl" refers to an unbranched hydrocarbon chain having 1, 2, or 3 carbon atoms, wherein all carbon-carbon bonds in the hydrocarbon chain are single bonds.

"Substituted with either hydroxy or a halogen" refers to the substitution of at least one hydrogen atom of a hydrocarbon chain with either hydroxy or a halogen.

"Straight C1-C3 alkenyl" encompasses both methylidene and an unbranched hydrocarbon chain having 2 or 3 carbon atoms, wherein at least one carbon-carbon bond in the unbranched hydrocarbon chain having 2 or 3 carbon atoms is a double bond.

"C2-C3 alkynyl" refers to an unbranched hydrocarbon chain having 2 or 3 carbon atoms, wherein exactly one carbon-carbon bond in the hydrocarbon chain is a triple bond.

In some embodiments, the dotted lines in general formulas II and III depict the bonding pattern of either cyclohexane, phenyl, or a cyclohexene that comprises exactly one double bond, which occurs at either A or B.

In some specific embodiments, R1 is a straight or branched C1-C12 alkyl that is optionally substituted with either phenyl or a cycloalkyl; R2 is methyl, hydroxymethyl, formyl, or fluoromethyl; R3 is methyl or methylidene; and the dotted lines in general formulas II and III depict the bonding pattern of a cyclohexene that comprises exactly one double bond, which occurs at A.

In some embodiments, R1 is methyl; ethyl; propyl; butyl; pentyl; hexyl; heptyl; octyl; nonyl; decyl; prop-2-yl; but-2-yl; pent-2-yl; hex-2-yl; hept-2-yl; octan-2-yl; nonan-2-yl; decan-2-yl; 2-methylpropyl; 2-methylbutyl; 2-methylpentyl; 2-methylhexyl; 2-methylheptyl; 2-methyloctyl; 2-methylnonyl; 2-methyldecyl; 2-methylprop-2-yl; 2-methylbut-2-yl; 2-methylpent-2-yl; 2-methylhex-2-yl; 2-methylhept-2-yl; 2-methyloctan-2-yl; 2-methylnonan-2-yl; 2-methyldecan-2-yl; 3-methylbut-2-yl; 3-methylpent-2-yl; 3-methylhex-2-yl; 3-methylhept-2-yl; 3-methyloctan-2-yl; 3-methylnonan-2-yl; 3-methyldecan-2-yl; 2,3-dimethylbut-2-yl; 2,3-dimethylpent-2-yl; 2,3-dimethylhex-2-yl; 2,3-dimethylhept-2-yl; 2,3-dimethyloctan-2-yl; 2,3-dimethylnonan-2-yl; 2,3-dimethyldecan-2-yl; cyclopropyl; 1-methylcyclopropyl; 1-ethylcyclopropyl; 1-propylcyclopropyl; 1-butylcyclopropyl; 1-pentylcyclopropyl; 1-hexylcyclopropyl; 1-heptylcyclopropyl; 1-octylcyclopropyl; 1-nonylcyclopropyl; cyclobutyl; 1-methylcyclobutyl; 1-ethylcyclobutyl; 1-propylcyclobutyl; 1-butylcyclobutyl; 1-pentylcyclobutyl; 1-hexylcyclobutyl; 1-heptylcyclobutyl; 1-octylcyclobutyl; cyclopentyl; 1-methylcyclopentyl; 1-ethylcyclopentyl; 1-propylcyclopentyl; 1-butylcyclopentyl; 1-pentylcyclopentyl; 1-hexylcyclopentyl; 1-heptylcyclopentyl; cyclohexyl; 1-methylcyclohexyl; 1-ethylcyclohexyl; 1-propylcyclohexyl; 1-butylcyclohexyl; 1-pentylcyclohexyl; 1-hexylcyclohexyl; ethenyl; prop-1-enyl; but-1-enyl; pent-1-enyl; hex-1-enyl; hept-1-enyl; octan-1-enyl; nonan-1-enyl; decan-1-enyl; ethynyl; prop-1-ynyl; but-1-ynyl; pent-1-ynyl; hex-1-ynyl; hept-1-ynyl; octan-1-ynyl; nonan-1-ynyl; decan-1-ynyl; 2-phenylethyl; or adamantyl.

In some very specific embodiments, R1 is heptyl.
In some very specific embodiments, R1 is pentyl.
In some very specific embodiments, R1 is propyl.
In some very specific embodiments, R2 is methyl.
In some specific embodiments, R3 is methyl, methylidene, 3-hydroxyprop-1-yl, 3-hydroxypropen-1-yl, or 3-hydroxypropyn-1-yl. In some very specific embodiments, R3 is methyl or methylidene.

In some embodiments, the organic oxide has the general formula II or III; and the dotted lines in general formulas II and III depict the bonding pattern of a cyclohexene that comprises exactly one double bond, which occurs at A.

In some embodiments, the organic oxide has the general formula II or III; and the dotted lines in general formulas II and III depict the bonding pattern of a cyclohexene that comprises exactly one double bond, which occurs at B.

In some embodiments, the organic oxide has the general formula III; and the dotted lines in general formula III depict the bonding pattern of phenyl.

In some very specific embodiments, the organic oxide has the general formula I; R1 is heptyl; R2 is methyl; and R3 is methyl.

In some very specific embodiments, the organic oxide has the general formula II; R1 is heptyl; R2 is methyl; R3 methylidene; and the dotted lines in general formula II depict the bonding pattern of a cyclohexene that comprises exactly one double bond, which occurs at A.

In some very specific embodiments, the organic oxide has the general formula II; R1 is heptyl; R2 is methyl; R3 is methylidene; and the dotted lines in general formula II depict the bonding pattern of a cyclohexene that comprises exactly one double bond, which occurs at B.

In some very specific embodiments, the organic oxide has the general formula III; R1 is heptyl; R2 is methyl; R3 is methyl; and the dotted lines in general formula III depict the bonding pattern of a cyclohexene that comprises exactly one double bond, which occurs at A.

In some very specific embodiments, the organic oxide has the general formula III; R1 is heptyl; R2 is methyl; R3 is methyl; and the dotted lines in general formula III depict the bonding pattern of a cyclohexene that comprises exactly one double bond, which occurs at B.

In some very specific embodiments, the organic oxide has the general formula III; R1 is heptyl; R2 is methyl; R3 is methyl; and the dotted lines in general formula III depict the bonding pattern of phenyl.

In some very specific embodiments, the organic oxide has the general formula I; R1 is pentyl; R2 is methyl; and R3 is methyl.

In some very specific embodiments, the organic oxide has the general formula II; R1 is pentyl; R2 is methyl; R3 methylidene; and the dotted lines in general formula II depict the bonding pattern of a cyclohexene that comprises exactly one double bond, which occurs at A.

In some very specific embodiments, the organic oxide has the general formula II; R1 is pentyl; R2 is methyl; R3 is methylidene; and the dotted lines in general formula II depict the bonding pattern of a cyclohexene that comprises exactly one double bond, which occurs at B.

In some very specific embodiments, the organic oxide has the general formula III; R1 is pentyl; R2 is methyl; R3 is methyl; and the dotted lines in general formula III depict the bonding pattern of a cyclohexene that comprises exactly one double bond, which occurs at A.

In some very specific embodiments, the organic oxide has the general formula III; R1 is pentyl; R2 is methyl; R3 is methyl; and the dotted lines in general formula III depict the bonding pattern of a cyclohexene that comprises exactly one double bond, which occurs at B.

In some very specific embodiments, the organic oxide has the general formula III; R1 is pentyl; R2 is methyl; R3 is methyl; and the dotted lines in general formula III depict the bonding pattern of phenyl.

In some very specific embodiments, the organic oxide has the general formula I; R1 is propyl; R2 is methyl; and R3 is methyl.

In some very specific embodiments, the organic oxide has the general formula II; R1 is propyl; R2 is methyl; R3 methylidene; and the dotted lines in general formula II depict the bonding pattern of a cyclohexene that comprises exactly one double bond, which occurs at A.

In some very specific embodiments, the organic oxide has the general formula II; R1 is propyl; R2 is methyl; R3 is methylidene; and the dotted lines in general formula II depict the bonding pattern of a cyclohexene that comprises exactly one double bond, which occurs at B.

In some very specific embodiments, the organic oxide has the general formula III; R1 is propyl; R2 is methyl; R3 is methyl; and the dotted lines in general formula III depict the bonding pattern of a cyclohexene that comprises exactly one double bond, which occurs at A.

In some very specific embodiments, the organic oxide has the general formula III; R1 is propyl; R2 is methyl; R3 is methyl; and the dotted lines in general formula III depict the bonding pattern of a cyclohexene that comprises exactly one double bond, which occurs at B.

In some very specific embodiments, the organic oxide has the general formula III; R1 is propyl; R2 is methyl; R3 is methyl; and the dotted lines in general formula III depict the bonding pattern of phenyl.

In some embodiments, the composition comprises a protic, polar solvent; and the cation, the anion, and the organic oxide are solutes that are dissolved in the protic, polar solvent.

"Protic, polar solvent" encompasses water and alcohols, including sugar alcohols. In some specific embodiments, the protic, polar solvent is an alcohol. In some very specific embodiments, the protic, polar solvent is a sugar alcohol.

"Dissolved" refers to a solute that is solvated in a liquid phase by either (i) a solvent, (ii) a cosolvent, or (iii) both a solvent and a cosolvent; a chemical species that is present within a phase that is dispersed within a liquid phase, such as the dispersed phase of an emulsion, is not dissolved in the liquid phase; a chemical species that is non-covalently bound to any chemical species that is a solid in the absence of a solvent, such as a cyclodextrin, is not dissolved in a solvent; a chemical species that is non-covalently bound to a solvent that is a solid in the absence of a cosolvent, such as certain sugar alcohols that can be solids in the absence of a cosolvent such as water, are dissolved in the solvent.

In some embodiments, the composition comprises ethanol; and the cation, the anion, and the organic oxide are solutes that are dissolved in the ethanol.

In some embodiments, the composition comprises glycerol; and the cation, the anion, and the organic oxide are solutes that are dissolved in the glycerol.

In some embodiments, the composition comprises water; and the cation, the anion, and the organic oxide are solutes that are dissolved in the water.

Various aspects of this patent document relate to a composition described anywhere in this patent document, for use as a medicament.

Various aspects of this patent document relate to a method to administer a composition to a subject, comprising administering a composition described anywhere in this patent document to a subject, wherein the subject is a human or an animal. In some specific embodiments, the subject is a rodent, lagomorph, feline, canine, porcine, ovine, caprine, lama, vicugna, bovine, equine, or primate. In some very specific preferred embodiments, the subject is human.

In some embodiments, administering comprises oral, rectal, sublingual, sublabial, buccal, intranasal, inhalational, transmucosal, topical, transdermal, intravenous, intramuscular, subcutaneous, intradermal, intraocular, parenteral, intrathecal, intralesional, or intratumoral administration. In some specific preferred embodiments, administering comprises oral, sublingual, or buccal administration. In some very specific preferred embodiments, administering comprises oral administration. In some very specific preferred embodiments, administering comprises topical administration.

Exemplification. Examples 1-3 set forth specific embodiments of this disclosure, and the examples do not limit the scope of the disclosure or any claim that matures from this patent document.

Example 1. Production of Organic Oxides

The cannabinoids of a *cannabis* oil distillate were converted into organic oxides by dissolving the *cannabis* oil distillate in 190 proof ethanol containing approximately 0.5 molar potassium hydroxide to produce a concentrate composition comprising (i) potassium cation; (ii) an anion that has the chemical formula $C_2H_5O^{-1}$; (iii) a range of organic oxides according to general formulas I, II, and III; (iv) hydroxide; and (v) water, wherein the potassium cation, the anion, and the organic oxides were solutes that were dissolved in the ethanol.

Example 2. Addition of Cations and Anions to Compositions Comprising Organic Oxides A concentrate composition prepared according to Example 1 was transferred into water to produce a composition comprising (i) potassium cation; (ii) an anion that has the chemical formula $C_2H_5O^{-1}$; (iii) a range of organic oxides according to general formulas I, II, and III; (iv) hydroxide; and (v) water, wherein the potassium cation, the anion, and the organic oxides were solutes that were dissolved in the water.

A concentrate composition prepared according to Example 1 was transferred into glycerol to produce a composition comprising (i) potassium cation; (ii) an anion that has the chemical formula $C_2H_5O^{-1}$; (iii) a range of organic oxides according to general formulas I, II, and III; (iv) hydroxide; (v) water, (vi) an anion that has the chemical formula $C_3H_7O_3^{-1}$; and (vii) glycerol, wherein the potassium cation, the anion, and the organic oxides were solutes that were dissolved in the glycerol.

Prophetic Example 3. Addition of Cations and Anions to Compositions Comprising Organic Oxides A concentrate composition prepared according to Example 1 is transferred into a protic, polar solvent. Salts that comprise one or more of lithium cation, sodium cation, magnesium cation, calcium cation, zinc cation, manganese cation, iron (II) cation, iron (III) cation, copper (I) cation, copper (II) cation, ammonium, protonated ethanolamine, choline, and protonated lysine are added to the solvent such that the cations are dissolved in the solvent. One or both of arginine and sphingosine are optionally added to the solvent such that protonated arginine and protonated sphingosine are dissolved in the solvent. Sugar alcohols are added to the solvent to produce anions that have one or more of the chemical formulas $C_3H_7O_2^{-1}$, $C_4H_9O_4^{-1}$, $C_5H_{11}O_5^{-1}$, $C_6H_{11}O_6^{-1}$, $C_6H_{13}O_6^{-1}$, and $C_7H_{15}O_7^{-1}$, which are dissolved in the solvent.

What is claimed is:

1. A composition, comprising a cation, an anion, and an organic oxide, wherein:
    the cation has a molecular weight of at least 6.9 and no greater than 301 grams per mole;
    the cation has a net charge of either +1, +2, or +3;
    the anion has the chemical formula $C_2H_5O^{-1}$, $C_3H_7O_2^{-1}$, $C_3H_7O_3^{-1}$, $C_4H_9O_4^{-1}$, $C_5H_{11}O_5^{-1}$, $C_6H_{11}O_6^{-1}$, $C_6H_{13}O_6^{-1}$, or $C_7H_{15}O_7^{-1}$;
    the anion is an unbranched, fully-saturated, linear or cyclic hydrocarbon chain that is substituted such that (i) an oxide group (—O⁻) is pendant from exactly one carbon atom of the hydrocarbon chain, and (ii) a single hydroxyl group (—OH) is optionally pendant from every other carbon atom of the hydrocarbon chain;
    the organic oxide has a molecular weight of at least 240 and no greater than 500 grams per mole;
    the organic oxide has the chemical formula $C_vH_wO_yX_z^{-1}$, wherein v is an integer of at least 16 and no greater than 25; w is an integer of at least 16 and no greater than 39; y is either 1, 2, or 3; z is either 0 or 1; and X is selected from F, Cl, Br, and I;
    the organic oxide comprises a benzene ring and an oxide group (—O⁻); the benzene ring comprises exactly 6 carbon atoms; and the oxide group is pendant from a carbon atom of the benzene ring;
    the organic oxide has a net charge of −1; and
    the organic oxide lacks a carboxyl group (—CO₂H and —CO₂⁻).

2. The composition of claim 1, wherein the cation is lithium cation ("Li+");
    sodium cation ("Na+"); potassium cation ("K+"); magnesium cation ("Mg++"); calcium cation ("Ca++"); zinc cation ("Zn++"); manganese cation ("Mn++"); iron (II) cation ("Fe++"); iron (III) cation ("Fe+++"); copper (I) cation ("Cu+"); copper (II) cation ("Cu++"); ammonium ("NH₄+"); protonated ethanolamine; choline; protonated lysine; protonated arginine; or protonated sphingosine.

3. The composition of claim 1 or 2, wherein the anion has the molecular formula $C_2H_5O^{-1}$.

4. The composition of claim 1 or 2, wherein the anion has the molecular formula $C_3H_7O_2^{-1}$.

5. The composition of claim 1 or 2, wherein the anion has the molecular formula $C_3H_7O_3^{-1}$.

6. The composition of claim 2, comprising hydroxide and water.

7. A composition, comprising a cation, an anion, an organic oxide, hydroxide, and water, wherein:
    the cation is selected from sodium cation ("Na+") and potassium cation ("K+");
    the anion has the chemical formula $C_2H_5O^{-1}$;
    the anion is an unbranched, fully-saturated, linear hydrocarbon chain that is substituted such that an oxide group (—O⁻) is pendant from exactly one carbon atom of the hydrocarbon chain;
    the organic oxide has a molecular weight of at least 240 and no greater than 388 grams per mole;
    the organic oxide has the chemical formula $C_vH_wO_y$, wherein v is an integer of at least 16 and no greater than 25; w is an integer of at least 16 and no greater than 39; and y is either 2 or 3;
    the organic oxide comprises a benzene ring and an oxide group (—O⁻); the benzene ring comprises exactly 6 carbon atoms; and the oxide group is pendant from a carbon atom of the benzene ring;
    the organic oxide has a net charge of −1; and
    the organic oxide lacks a carboxyl group (—CO₂H and —CO₂⁻).

8. A composition, comprising a cation, an anion, an organic oxide, hydroxide, and water, wherein:
    the cation is selected from sodium cation ("Na+") and potassium cation ("K+");
    the anion has the chemical formula $C_3H_7O_3^{-1}$;
    the anion is an unbranched, fully-saturated, linear hydrocarbon chain that is substituted such that (i) an oxide group (—O⁻) is pendant from exactly one carbon atom of the hydrocarbon chain, and (ii) a single hydroxyl group (—OH) is pendant from every other carbon atom of the hydrocarbon chain;
    the organic oxide has a molecular weight of at least 240 and no greater than 388 grams per mole;
    the organic oxide has the chemical formula $C_vH_wO_y$, wherein v is an integer of at least 16 and no greater than 25; w is an integer of at least 16 and no greater than 39; and y is either 2 or 3;
    the organic oxide comprises a benzene ring and an oxide group (—O—); the benzene ring comprises exactly 6 carbon atoms; and the oxide group is pendant from a carbon atom of the benzene ring;
    the organic oxide has a net charge of −1; and
    the organic oxide lacks a carboxyl group (—CO₂H and —CO₂⁻).

9. The composition of any one of claims 1, 2, 7, and 8, wherein the cation is sodium cation.

10. The composition of any one of claims 1, 2, 7, and 8, wherein the cation is potassium cation.

11. The composition of any one of claims 2, 7, and 8, comprising the cation at a greater concentration than the anion by mole.

12. The composition of any one of claims 2, 7, and 8, comprising the cation at a greater concentration than the organic oxide by mole.

13. The composition of any one of claims 2, 7, and 8, wherein the organic oxide has the general formula I, II, or III,

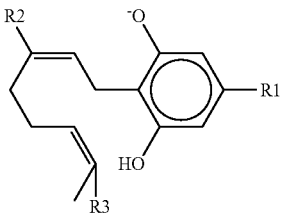

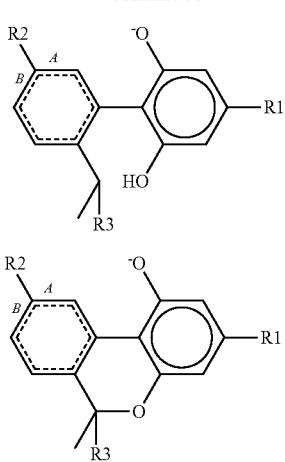

wherein:
R1 is selected from H; a straight or branched C1-C12 alkyl that is optionally substituted with either phenyl, a cycloalkyl, or a halogen; a straight or branched C2-C12 alkenyl that is optionally substituted with either phenyl, a cycloalkyl, or a halogen; and a straight or branched C2-C12 alkynyl that is optionally substituted with either phenyl, a cycloalkyl, or a halogen;

R2 is selected from oxo; methylidene; methyl; hydroxymethyl; formyl; methoxycarbonyl;
ethoxycarbonyl; 2-propoxycarbonyl; fluoromethyl; chloromethyl; and
iodomethyl;

R3 is selected from a straight C1-C3 alkyl that is optionally substituted with either hydroxy or a halogen; a straight C1-C3 alkenyl that is optionally substituted with either hydroxy or a halogen; and a C2-C3 alkynyl that is optionally substituted with either hydroxy or a halogen; and the dotted lines in general formulas II and III depict the bonding pattern of either cyclohexane, phenyl, or a cyclohexene that comprises exactly one double bond, which occurs at either A or B.

14. The composition of claim 13, wherein:
R1 is a straight or branched C1-C12 alkyl that is optionally substituted with either phenyl or a cycloalkyl;
R2 is methyl, hydroxymethyl, formyl, or fluoromethyl;
R3 is methyl or methylidene; and
the dotted lines in general formulas II and III depict the bonding pattern of a cyclohexene that comprises exactly one double bond, which occurs at A.

15. The composition of claim 13, wherein R1 is methyl; ethyl; propyl; butyl; pentyl; hexyl; heptyl; octyl; nonyl; decyl; prop-2-yl; but-2-yl; pent-2-yl; hex-2-yl; hept-2-yl; octan-2-yl; nonan-2-yl; decan-2-yl; 2-methylpropyl; 2-methylbutyl; 2-methylpentyl; 2-methylhexyl; 2-methylheptyl; 2-methyloctyl; 2-methylnonyl; 2-methyldecyl; 2-methylprop-2-yl; 2-methylbut-2-yl; 2-methylpent-2-yl; 2-methylhex-2-yl; 2-methylhept-2-yl; 2-methyloctan-2-yl; 2-methylnonan-2-yl; 2-methyldecan-2-yl; 3-methylbut-2-yl; 3-methylpent-2-yl; 3-methylhex-2-yl; 3-methylhept-2-yl; 3-methyloctan-2-yl; 3-methylnonan-2-yl; 3-methyldecan-2-yl; 2,3-dimethylbut-2-yl; 2,3-dimethylpent-2-yl; 2,3-dimethylhex-2-yl; 2,3-dimethylhept-2-yl; 2,3-dimethyloctan-2-yl; 2,3-dimethylnonan-2-yl; 2,3-dimethyldecan-2-yl; cyclopropyl; 1-methylcyclopropyl; 1-ethylcyclopropyl; 1-propylcyclopropyl; 1-butylcyclopropyl; 1-pentylcyclopropyl; 1-hexylcyclopropyl; 1-heptylcyclopropyl; 1-octylcyclopropyl; 1-nonylcyclopropyl; cyclobutyl; 1-methylcyclobutyl; 1-ethylcyclobutyl; 1-propylcyclobutyl; 1-butylcyclobutyl; 1-pentylcyclobutyl; 1-hexylcyclobutyl; 1-heptylcyclobutyl; 1-octylcyclobutyl; cyclopentyl; 1-methylcyclopentyl; 1-ethylcyclopentyl; 1-propylcyclopentyl; 1-butylcyclopentyl; 1-pentylcyclopentyl; 1-hexylcyclopentyl; 1-heptylcyclopentyl; cyclohexyl; 1-methylcyclohexyl; 1-ethylcyclohexyl; 1-propylcyclohexyl; 1-butylcyclohexyl; 1-pentylcyclohexyl; 1-hexylcyclohexyl; ethenyl; prop-1-enyl; but-1-enyl; pent-1-enyl; hex-1-enyl; hept-1-enyl; octan-1-enyl; nonan-1-enyl; decan-1-enyl; ethynyl; prop-1-ynyl; but-1-ynyl; pent-1-ynyl; hex-1-ynyl; hept-1-ynyl; octan-1-ynyl; nonan-1-ynyl; decan-1-ynyl; 2-phenylethyl; or adamantyl.

16. The composition of claim 13, wherein R1 is heptyl.
17. The composition of claim 13, wherein R1 is pentyl.
18. The composition of claim 13, wherein R1 is propyl.
19. The composition claim 13, wherein R2 is methyl.
20. The composition claim 13, wherein R3 is methyl, methylidene, 3-hydroxyprop-1-yl, 3-hydroxypropen-1-yl, or 3-hydroxypropyn-1-yl.
21. The composition of claim 13, wherein R3 is methyl or methylidene.
22. The composition of claim 13, wherein; the organic oxide has the general formula II or III; and the dotted lines in general formulas II and III depict the bonding pattern of a cyclohexene that comprises exactly one double bond, which occurs at A.
23. The composition of claim 13, wherein; the organic oxide has the general formula II or III; and the dotted lines in general formulas II and III depict the bonding pattern of a cyclohexene that comprises exactly one double bond, which occurs at B.
24. The composition of claim 13, wherein the organic oxide has the general formula III; and the dotted lines in general formula III depict the bonding pattern of phenyl.
25. The composition of claim 13, wherein:
the organic oxide has the general formula I;
R1 is heptyl;
R2 is methyl; and
R3 is methyl.
26. The composition of claim 13, wherein the organic oxide has the general formula II; R1 is heptyl; R2 is methyl; R3 methylidene; and the dotted lines in general formula II depict the bonding pattern of a cyclohexene that comprises exactly one double bond, which occurs at A.
27. The composition of claim 13, wherein the organic oxide has the general formula II; R1 is heptyl; R2 is methyl; R3 is methylidene; and the dotted lines in general formula II depict the bonding pattern of a cyclohexene that comprises exactly one double bond, which occurs at B.
28. The composition of claim 13, wherein the organic oxide has the general formula III; R1 is heptyl; R2 is methyl; R3 is methyl; and the dotted lines in general formula III depict the bonding pattern of a cyclohexene that comprises exactly one double bond, which occurs at A.
29. The composition of claim 13, wherein the organic oxide has the general formula III; R1 is heptyl; R2 is methyl; R3 is methyl; and the dotted lines in general formula III depict the bonding pattern of a cyclohexene that comprises exactly one double bond, which occurs at B.
30. The composition of claim 13, wherein the organic oxide has the general formula III; R1 is heptyl; R2 is methyl; R3 is methyl; and the dotted lines in general formula III depict the bonding pattern of phenyl.

31. The composition of claim 13, wherein the organic oxide has the general formula I; R1 is pentyl; R2 is methyl; and R3 is methyl.

32. The composition of claim 13, wherein the organic oxide has the general formula II; R1 is pentyl; R2 is methyl; R3 methylidene; and the dotted lines in general formula II depict the bonding pattern of a cyclohexene that comprises exactly one double bond, which occurs at A.

33. The composition of claim 13, wherein the organic oxide has the general formula II; R1 is pentyl; R2 is methyl; R3 is methylidene; and the dotted lines in general formula II depict the bonding pattern of a cyclohexene that comprises exactly one double bond, which occurs at B.

34. The composition of claim 13, wherein the organic oxide has the general formula III; R1 is pentyl; R2 is methyl; R3 is methyl; and the dotted lines in general formula III depict the bonding pattern of a cyclohexene that comprises exactly one double bond, which occurs at A.

35. The composition of claim 13, wherein the organic oxide has the general formula III; R1 is pentyl; R2 is methyl; R3 is methyl; and the dotted lines in general formula III depict the bonding pattern of a cyclohexene that comprises exactly one double bond, which occurs at B.

36. The composition of claim 13, wherein the organic oxide has the general formula III; R1 is pentyl; R2 is methyl; R3 is methyl; and the dotted lines in general formula III depict the bonding pattern of phenyl.

37. The composition of claim 13, wherein the organic oxide has the general formula I; R1 is propyl; R2 is methyl; and R3 is methyl.

38. The composition of claim 13, wherein the organic oxide has the general formula II; R1 is propyl; R2 is methyl; R3 methylidene; and the dotted lines in general formula II depict the bonding pattern of a cyclohexene that comprises exactly one double bond, which occurs at A.

39. The composition of claim 13, wherein the organic oxide has the general formula II; R1 is propyl; R2 is methyl; R3 is methylidene; and the dotted lines in general formula II depict the bonding pattern of a cyclohexene that comprises exactly one double bond, which occurs at B.

40. The composition of claim 13, wherein the organic oxide has the general formula III; R1 is propyl; R2 is methyl; R3 is methyl; and the dotted lines in general formula III depict the bonding pattern of a cyclohexene that comprises exactly one double bond, which occurs at A.

41. The composition of claim 13, wherein the organic oxide has the general formula III; R1 is propyl; R2 is methyl; R3 is methyl; and the dotted lines in general formula III depict the bonding pattern of a cyclohexene that comprises exactly one double bond, which occurs at B.

42. The composition of claim 13, wherein the organic oxide has the general formula III; R1 is propyl; R2 is methyl; R3 is methyl; and the dotted lines in general formula III depict the bonding pattern of phenyl.

43. The composition of any one of 2, 7, and 8, comprising a protic, polar solvent, wherein the cation, the anion, and the organic oxide are solutes that are dissolved in the protic, polar solvent.

44. The composition of any one of 2, 7, and 8, comprising ethanol, wherein the cation, the anion, and the organic oxide are solutes that are dissolved in the ethanol.

45. The composition of any one of claims 2, 7, and 8, comprising glycerol, wherein the cation, the anion, and the organic oxide are solutes that are dissolved in the glycerol.

46. The composition of any one of claims 2, 7, and 8, comprising water, wherein the cation, the anion, and the organic oxide are solutes that are dissolved in the water.

47. The composition according to any one of claims 2, 7, and 8, for use as a medicament.

48. A method to administer a composition to a subject, comprising administering a composition according to any one of claims 2, 7, and 8 to a subject, wherein the subject is a human or an animal.

49. A method to administer a composition to a subject, comprising orally administering a composition according to any one of claims 2, 7, and 8 to a subject, wherein the subject is a human or an animal.

50. A method to administer a composition to a subject, comprising topically administering a composition according to any one of claims 2, 7, and 8 to a subject, wherein the subject is a human or an animal.

* * * * *